United States Patent
Strobl

(10) Patent No.: US 9,206,718 B2
(45) Date of Patent: Dec. 8, 2015

(54) COMBUSTION SYSTEM AND METHOD FOR CLEANING A CATALYTIC CONVERTER INSTALLED IN AN EXHAUST DUCT OF A COMBUSTION SYSTEM

(75) Inventor: Klaus Strobl, Inchenhofen (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 176 days.

(21) Appl. No.: 13/409,580

(22) Filed: Mar. 1, 2012

(65) Prior Publication Data

US 2012/0222403 A1  Sep. 6, 2012

Related U.S. Application Data

(63) Continuation of application No. PCT/EP2010/005340, filed on Aug. 31, 2010.

(30) Foreign Application Priority Data

Sep. 1, 2009 (DE) .......................... 10 2009 039 536

(51) Int. Cl.
  *F01N 3/00* (2006.01)
  *F01N 3/02* (2006.01)

(52) U.S. Cl.
  CPC ............... *F01N 3/02* (2013.01); *F01N 2290/02* (2013.01); *F01N 2290/06* (2013.01); *F01N 2590/02* (2013.01); *Y02T 10/20* (2013.01)

(58) Field of Classification Search
  USPC .............................. 60/274, 295, 297, 310, 311
  See application file for complete search history.

(56) References Cited

U.S. PATENT DOCUMENTS

| 2,880,079 | A | * | 3/1959 | Cornelius ...................... 422/107 |
| 3,231,016 | A | | 1/1966 | Stewart et al. |
| 3,648,441 | A | * | 3/1972 | Soria et al. ...................... 96/332 |
| 3,768,981 | A | * | 10/1973 | Alliger .......................... 422/171 |
| 3,910,772 | A | * | 10/1975 | Fennessy ...................... 422/178 |
| 5,272,874 | A | | 12/1993 | Paas |
| 6,058,698 | A | * | 5/2000 | Coral et al. ..................... 60/275 |

FOREIGN PATENT DOCUMENTS

| DE | 10 2004 062 677 A1 | 6/2006 |
| EP | 0 824 973 A2 | 2/1998 |
| GB | 1 072 904 | 6/1967 |
| JP | 356053718 | * 5/1981 ...................... 60/311 |
| JP | H03-26322 | 3/1991 |
| JP | 02007170277 A | * 7/2007 ...................... 60/295 |
| JP | 2008-029912 | 2/2008 |

OTHER PUBLICATIONS

International Search Report of PCT/EP2010/005340, Dated Dec. 6, 2010.

* cited by examiner

*Primary Examiner* — Binh Q Tran
(74) *Attorney, Agent, or Firm* — Gary D. Mangels

(57) ABSTRACT

In order to achieve effective cleaning of an inlet side of a catalytic converter in a combustion system, in particular a large-scale internal combustion engine system, a cleaning device having a cleaning brush for mechanically removing deposits is provided on the inlet side. The cleaning brush effectively and reliably removes and swirls up the deposits which have been formed, which are carried away with the exhaust gas in the flow direction through the catalytic converter.

13 Claims, 2 Drawing Sheets

COMBUSTION SYSTEM AND METHOD FOR CLEANING A CATALYTIC CONVERTER INSTALLED IN AN EXHAUST DUCT OF A COMBUSTION SYSTEM

CROSS-REFERENCE TO RELATED APPLICATION

This is a continuation application, under 35 U.S.C. §120, of co-pending international application No. PCT/EP2010/005340, filed Aug. 31, 2010, which designated the United States; this application also claims the priority, under 35 U.S.C. §119, of German patent application No. DE10 2009 039 536.9, filed Sep. 1, 2009; the prior applications are herewith incorporated by reference in their entirety.

BACKGROUND OF THE INVENTION

Field of the Invention

The invention relates to a combustion system and to a method for cleaning a catalytic converter installed in an exhaust duct of a combustion system.

In the present case, a combustion system means, in particular, large-scale industrial systems which have a power of several MW up to 100 MW. In particular, this means internal combustion engine systems, in which the power is provided by an internal combustion engine, in particular a diesel engine. Internal combustion engine systems such as these are used, for example, as stationary systems in a power station for energy generation. Furthermore, diesel engine systems such as these are also used as a propulsion motor in the marine-vessel field, in particular for large cargo ships.

In addition, a combustion system also refers to an internal combustion engine for goods vehicles and rail vehicles.

In combustion systems such as these, a catalytic exhaust gas cleaning device with a catalytic converter is normally provided in an exhaust duct of the combustion system. In this case, various catalysts are used to reduce or remove the hazardous substances contained in the exhaust gas. For example, a so-called DeNOx catalyst is used. In the case of this catalyst, nitrogen components contained in the exhaust gas are converted to nitrogen and water, with the addition of a reduction agent, for example ammonia or a precursor product thereof, such as an aqueous urea solution. Catalysts such as these are also referred to as SCR catalysts, since they operate on the principle of selective catalytic reduction. The reduction agent is normally injected as a urea solution into the exhaust duct, upstream of the catalytic converter.

Particularly in the case of large-scale industrial combustion systems, the catalytic converter may in this case have a multiplicity of individual catalysts which are arranged alongside one another like modules and each have a multiplicity of individual flow ducts or catalyst ducts through which the exhaust gas can flow, in order to provide as large a catalytically active surface area as possible. In this case, for example, the catalysts are in the form of extruded honeycomb catalysts, which consist of a catalytic material or are coated or impregnated with such a material.

Because of the normally very fine configuration of the individual flow ducts with very small cross-sectional areas, the use of such catalytic converters for internal combustion engine systems, in particular diesel engine systems, results in the problem of the inlet side of the catalysts becoming blocked with deposits, specifically in particular with soot, which is generally created when heavy oils or other fuels that can be burnt only with difficulty are burnt. This results in the available catalyst surface area being reduced, thus considerably reducing the catalytic surface reaction and causing the exhaust gas values to deteriorate, that is to say the cleaning effect of the catalytic converter decreases. In addition, the so-called exhaust gas back-pressure of the combustion system often increases because of its becoming dirty, since only a small flow cross section is still available for the exhaust gas. This leads to increased fuel consumption for the internal combustion engine, because its efficiency falls owing to the rising exhaust gas back-pressure.

Compressed air or hot steam can be used to blow these deposits away. For this purpose, injection devices fitted at the side in the exhaust duct, so-called soot blower valves, are arranged, via which the compressed air or the hot steam is blown in briefly at high pressure. This causes the dust on the inlet side to swirl up, and it is then passed through the catalytic converter together with the exhaust gas flow. The blowing-in pressure is applied via suitable compressors, in which case complex ring supply lines normally have to be provided, in order to supply the fluid to the soot blower valves, which are arranged in the distributed manner. When using hot steam, this must be taken from the system process or must be provided from a separate energy source. In practice, soot blowing valves such as these are generally activated, for example, up to every 20 seconds, and therefore consume a particularly large amount of energy. Furthermore, the problem exists that the entire inlet side of the catalytic converter cannot be cleaned reliably, because of the discrete arrangement of the soot blowing valves. Flow dead areas are therefore formed, where the deposits cannot be removed and in which the catalyst ducts therefore become blocked. This leads to a considerable reduction in the catalytically active surface area. The entire catalytic converter is therefore normally configured with considerable safety margins, and this leads to additional costs.

Because of the large amounts of exhaust gas from large-scale industrial combustion systems such as these, a correspondingly large incident-flow or cross-sectional area is required for the catalytic converter. By way of example, the exhaust duct in the area of the catalytic converter often has a cross-sectional area of several $m^2$, in particular several $10\,m^2$, up to the order of magnitude of $100\,m^2$. In addition, a plurality of catalyst layers are often arranged one behind the other in the flow direction of the exhaust gas, for effective exhaust gas cleaning. The problem of soot deposits in this case occurs primarily on the inlet side of the catalytic converter, that is to say on the inlet side of the first catalyst layer, which effectively also acts as a type of filter.

SUMMARY OF THE INVENTION

It is accordingly an object of the invention to provide a combustion system and a method for cleaning a catalytic converter installed in an exhaust duct of a combustion system which overcome the above-mentioned disadvantages of the prior art methods and devices of this general type, and which allows effective cleaning of an inlet side of the catalytic converter arranged in the exhaust duct of a combustion system such as this.

According to the invention, the object is achieved by a combustion system, in particular a large-scale industrial internal combustion engine system, for example a stationary internal combustion engine system for energy generation, or else a marine-vessel engine system. The combustion system contains an exhaust duct for carrying away an exhaust gas created during combustion. A catalytic converter, through which the exhaust gas can flow, for catalytic exhaust gas cleaning is arranged in the exhaust duct and normally has a multiplicity of flow ducts, which extend in the flow direction of the exhaust gas, with a small cross-sectional area, typically in the range considerably less than 1 cm². These flow ducts have inlet openings for the exhaust gas, on an inlet side of the catalytic converter. A cleaning device is provided in order to clean them and in order to remove deposits, containing a cleaning brush for mechanical removing of deposits on the inlet side. The cleaning device preferably extends over the entire width of the inlet side, that is to say in particular over the width of an incident-flow area of the catalytic converter.

The cleaning brush effectively and reliably removes and swirls up the deposits which have been formed, which are carried away with the exhaust gas in the flow direction through the catalytic converter. In this case, the mechanical action advantageously also reduces the size of the deposited particles, thus allowing them to flow through the catalytic converter with the exhaust gas more effectively and reliably, without blocking it. A further major advantage is that the use of the cleaning brush makes it possible to reliably remove deposits from the entire area of the inlet side of the catalytic converter, as a result of which no dead zones are formed in which the flow ducts become blocked. In particular, this makes it possible to keep the cross-sectional area of the catalytic converter small, and the catalytic converter can be designed with comparatively low safety margins, thus making it possible to achieve considerable cost savings in comparison to the previous method in which deposits are blown away.

In this case, in particular, the cleaning brush rotates about a rotation axis and has brush hairs. These are typically elastic, as a result of which they rest closely on the inlet side during brush operation, and partially even penetrate somewhat into the flow ducts, thus allowing their inlet openings to be very effectively kept clean. The material used for the cleaning brush is a material which is sufficiently resistant to high temperatures and, in particular, can withstand a temperature of up to about 600°.

By way of example, steel, aluminum or else a high-temperature-resistant plastic is used as the temperature-resistant material.

Expediently, the cleaning brush covers only a fraction of the inlet side and can be moved over the inlet side during operation of the combustion system. The movement capability results in the cleaning brush reaching every area of the inlet side. At the same time, the flow resistance produced by the cleaning brush is kept as low as possible. If no cleaning is required, the brush cleaning device is preferably moved to a parked position, which is located outside the catalyst inlet area. This prevents any pressure loss. The cross-sectional area of the entire catalytic converter which is covered by the cleaning device with the cleaning brush in this case occupies considerably less than 10% of the area of the inlet side of the catalytic converter, and in particular in the range between about 1% and 5% of the area of the inlet side.

The cleaning brush is preferably in the form of a roller and rotates about its roller longitudinal axis during operation. In consequence, the dust which has been scratched off by the brush is first of all removed from the inlet side and, because of the rotation and centrifugal forces, is thrown backward again into the exhaust gas flow. This prevents the deposits, specifically soot and dust particles, from being rubbed in on the inlet side, or prevents the brush from becoming blocked.

According to one preferred refinement, the cleaning brush extends over the entire width of the inlet side. In this case, the brush therefore needs be moved in only one movement direction, for example in the longitudinal or lateral direction. In this case, it is expedient for the cleaning brush to be guided and movable in the longitudinal or lateral direction on guide rails which run at the edge.

In general, guide elements such as guide rails or guide rods are provided for movement of the cleaning brush, and are preferably arranged at the edge on the exhaust duct.

According to one preferred alternative, the cleaning brush does not extend over the entire width. In this case, the cleaning brush can be moved in both the lateral and longitudinal directions. In addition, a lateral guide is provided, which extends over the inlet side and, in particular, is connected to the guide elements at the edge, or is mounted there. Appropriate drives are generally provided for movement of the cleaning device, moving the cleaning device in the lateral direction or in the lateral and longitudinal directions.

In order to ensure that the cleaning brush is available for use for as long a time as possible, and that blockage of the cleaning brush is prevented, the cleaning brush has an associated stripping element, a so-called doctor. This is used for cleaning the brush hairs of the cleaning brush. The stripping element is expediently arranged such that it follows directly in the rotation direction of the brush, for example at a rotation angle in the range between 60° and 150° with respect to the flow direction of the exhaust gas. The stripping element is generally positioned such that the individual brush hairs mechanically pass over the stripping element, as a result of which particles which are located on the brush hairs are reliably stripped off.

The stripping element expediently has a stripping edge which is oriented approximately radially with respect to the brush rotation axis, namely the roller longitudinal axis, such that the brush hairs are first of all elastically stressed during the stripping process, and the stress is then removed again, in particular abruptly. Because of the elasticity of the brush hairs, this refinement achieves an additional cleaning effect for the brush hairs, since the elastic stressing force results in any residual particles which may still be located on the brush hairs being thrown off when the stress is removed.

In addition to the cleaning brush, the cleaning device expediently has an injection device, for example a spraying device having a multiplicity of nozzles for a cleaning fluid. By way of example, the cleaning fluid is pure compressed air or compressed air mixed with cleaning liquid, or else a pure cleaning liquid, which is sprayed. The spraying device is in this case preferably oriented such that the cleaning fluid is sprayed directly onto the inlet side, or optionally onto the brush hairs. The introduction of the cleaning fluid additionally assists the cleaning effect. When applied directly to the brush hairs, this additionally assists the cleaning of the brush hairs themselves, and prevents the brushes from becoming blocked, for as long as possible.

The injection device is expediently associated with the cleaning brush, and can be moved together with it. There is therefore no need to provide nozzles for the introduction of the cleaning fluid circumferentially around the entire catalytic converter. In fact, specific and thus efficient introduction of the cleaning fluid is achieved. The injection device is in this case expediently arranged such that it leads in the movement direction of the brush, thus resulting in the cleaning fluid being applied to the inlet side or to the brush hairs before the brush hairs pass over the point to be cleaned.

In one preferred refinement, the cleaning device contains a housing in which the cleaning brush is arranged and which is open at least at the inlet side of the catalytic converter. Expediently, the housing is also open at the bottom, thus allowing the particles which have been scratched off to be thrown out downwards. The housing is provided with an incident-flow area toward the rearward side, that is to say the side opposite the inlet side, against and around which the flowing exhaust gas flows during operation. This incident-flow area may be configured appropriately as required, in order to keep the flow resistance caused by the cleaning device as low as possible.

The injection device is also expediently arranged in this housing. Overall, the cleaning device is therefore preferably in the form of a housing unit which can be moved over the inlet side of the catalytic converter and, for example, is guided with the aid of guide elements in the lateral and longitudinal directions.

A fluid motor is expediently provided in order to drive the cleaning brush and the brush is therefore preferably driven pneumatically or else hydraulically. A drive such as this, in particular in the form of a pneumatic motor, has only a low susceptibility to defects.

According to one preferred refinement, the catalytic converter contains a plurality of catalyst layers, which follow one another in the flow direction of the exhaust gas. At least one of the catalyst layers, preferably the first catalyst layer, is in this case associated with a cleaning device. Expediently, only the first catalyst layer is associated with a cleaning device having a cleaning brush, since most of the deposits occur on the first catalyst layer. By way of example, a conventional blowing-off device is arranged as a cleaning device on the subsequent catalyst layers.

According to the invention, the object is furthermore achieved by a method for cleaning a catalytic converter which is installed in an exhaust duct of a combustion system, wherein a cleaning brush is used to remove deposits from an inlet side of the catalytic converter. In this case, the cleaning is carried out in particular during operation. The cleaning device is in this case in the form of a traversing unit, which moves continuously or else at specific cleaning intervals over the area of the inlet side to be cleaned.

Other features which are considered as characteristic for the invention are set forth in the appended claims.

Although the invention is illustrated and described herein as embodied in a combustion system and a method for cleaning a catalytic converter installed in an exhaust duct of a combustion system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts having the same effect are provided with the same reference symbols in the figures.

Figure 1:
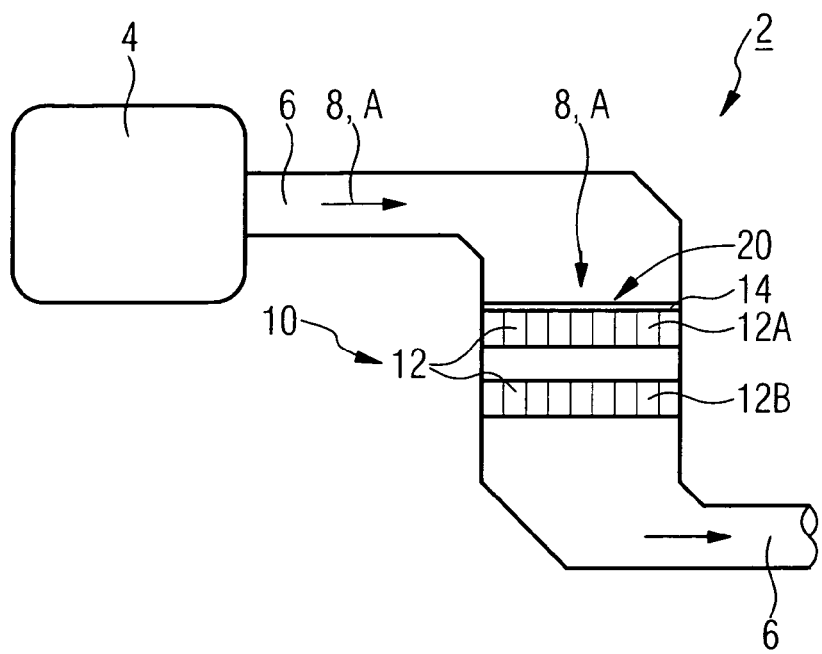
FIG. 1 is a highly simplified illustration of a detail of a large-scale industrial combustion system according to the invention.

Referring now to the figures of the drawing in detail and first, particularly, to FIG. 1 thereof, there is shown, schematically and in a highly simplified form, a combustion system 2 which has a combustion unit, in particular an internal combustion engine 4, preferably a diesel engine, to which an exhaust duct 6 is connected. An exhaust gas A flows through the exhaust duct in a flow direction 8. A catalytic exhaust gas cleaning device 10 is provided in the flow direction 8. For this purpose, the exhaust duct 6 broadens considerably in order to have a sufficiently large cross-sectional area. The normally rectangular cross-sectional area of the exhaust duct 6 is, for example, from 1 to 30 $m^2$ in the area of the exhaust gas cleaning device 10.

The exhaust gas cleaning device 10 contains a catalytic converter 12 which, in the exemplary embodiment, has two catalyst layers 12A, 12B. A multiplicity of individual catalyst elements or else catalyst modules, each having an installation frame, are normally arranged in each of the two catalyst layers. By way of example, the catalyst elements are so-called SCR catalysts. In this case, a reduction agent, in particular a urea solution, is also injected into the exhaust gas flow upstream of the catalytic converter 12 in the flow direction 8.

The catalytic converter 12 has an inlet side 14 where the exhaust gas A enters the catalytic converter 12 and flows through it in the flow direction 8. The individual catalyst elements in this case have flow ducts 16 which extend in the flow direction 8 and have inlet openings 18 on the inlet side 14. In this case, the catalyst elements 6 are typically in the form of honeycombs. Therefore, in particular, the catalysts are so-called honeycomb catalysts, which are produced by extrusion of an extrudable ceramic mass. The cross-sectional area of the inlet openings 18 is typically in the range from 7 to 50 $mm^2$ (FIGS. 2 and 3).

A cleaning device 20, which is indicated only schematically in FIG. 1 and which is used to remove deposits such as soot and dust particles from the inlet side 14, is arranged upstream of the catalytic converter 12.

Figure 2:
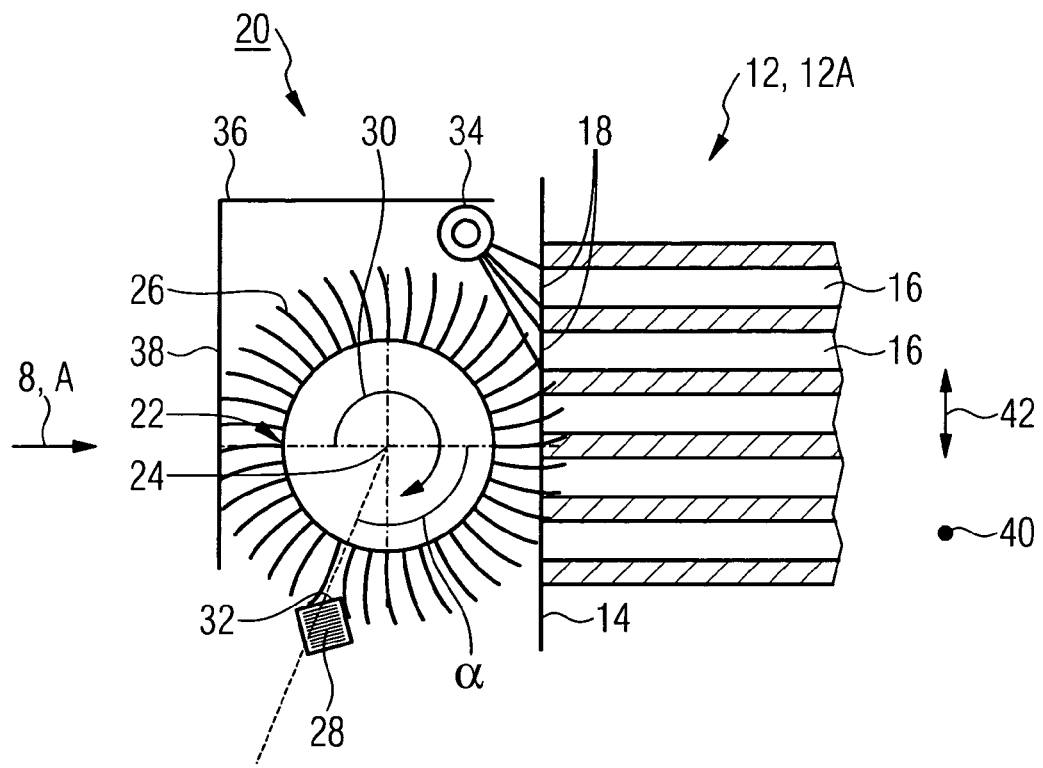
FIG. 2 is a diagrammatic, partially sectioned, side view of a cleaning device and a detail of a catalytic converter according to a first embodiment with a housing unit which traverses both in the lateral and longitudinal directions.
Figure 3:
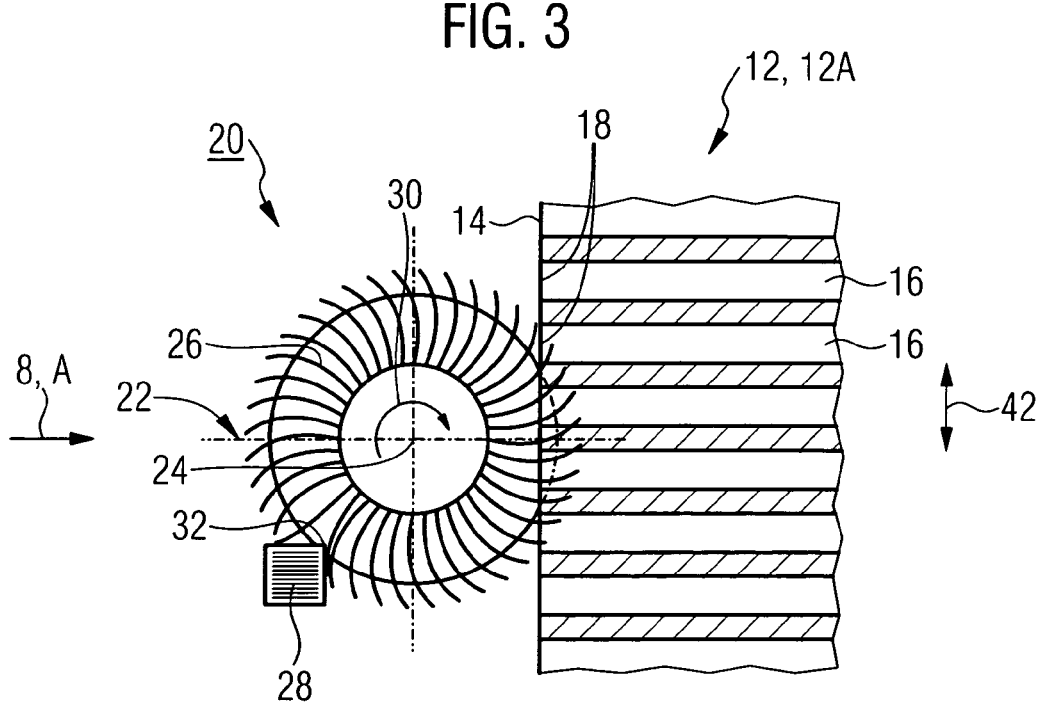
FIG. 3 is an illustration, comparable to FIG. 2, of an alternative refinement with a cleaning brush which extends over the entire width of the catalytic converter.

As can be seen from FIGS. 2 and 3, in both the embodiment variants in FIGS. 2 and 3, the cleaning device has a cleaning brush 22, which is in the form of a roller or cylinder and can rotate about a roller longitudinal axis 24. The cleaning brush 22 has a multiplicity of individual brush hairs 26 on the envelope surface of a base body. The cleaning device 20 furthermore has a stripping element 28 which, for example, is in the form of a polygonal rod which runs in the direction of the roller longitudinal axis 24. The stripping element 28 has a stripping edge 32, which is oriented approximately in the radial direction with respect to the roller longitudinal axis 24. The stripping element 28 is arranged such that a radial through the stripping edge 32 is arranged at an angle α with respect to a normal to the inlet side 14 (corresponds to the flow direction 8). The stripping element 28 is preferably arranged such that it lags behind the inlet side 14 in the rotation direction 30 of the cleaning brush 22. The angle α is preferably in a range from about 60° to 150°.

In addition, an injection device 34 is provided in the exemplary embodiment shown in FIG. 2, via which a cleaning fluid can be injected, for example compressed air, a cleaning aerosol or a pure cleaning liquid. For this purpose, by way of example, the injection device 34 has a plurality of individual nozzles, which are not illustrated in any more detail here but are arranged at uniform intervals in the longitudinal direction of the cleaning brush 22. The injection device 34 is in this case preferably arranged such that it leads toward the cleaning brush 22 in the rotation direction 30. In the exemplary embodiment shown in FIG. 2, the injection device 34 is oriented such that the cleaning fluid is sprayed directly onto the inlet side 14 and into the inlet openings 18.

In the exemplary embodiment shown in FIG. 2, the cleaning device 20 also includes a housing 36 which, in the exemplary embodiment, has a rear incident-flow area 38 and an upper wall and opposite end walls on the end face of the cleaning brush 22, in which the latter is mounted such that it can rotate. The housing 36 is open both at the front toward the inlet side 14 and downward, where the stripping element 28 is arranged. The cleaning device 20 illustrated in FIG. 2 is therefore, in particular, in the form of a traversing housing unit, which can be moved both in the lateral direction 40, that is to say in the roller longitudinal direction 24, over the width of the catalytic converter 12, and in the longitudinal direction 42 at right angles to this lateral direction 40. By way of example, for this purpose, the housing 36 is arranged such that it can be moved on a supporting unit, which is not illustrated in any more detail here. By way of example, this supporting unit has a lateral traverse, which is guided at its ends in two longitudinal guides, as a result of which the supporting unit is approximately H-shaped.

Figure 4:
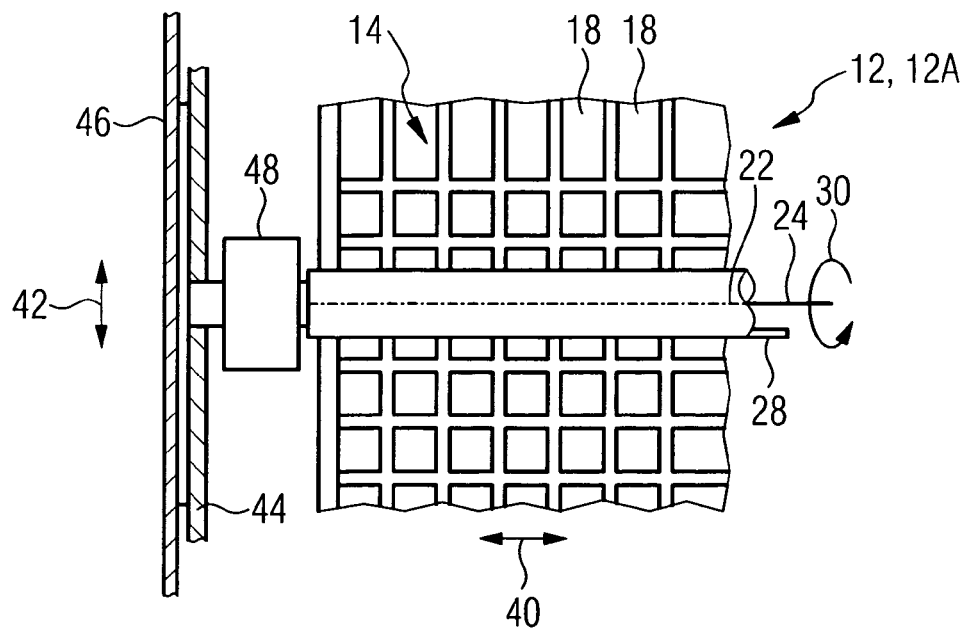
FIG. 4 is a diagrammatic, plan view of a cleaning device and of the inlet side of a catalytic converter according to the second embodiment variant.

In contrast to this, in the second exemplary embodiment, which is illustrated in FIGS. 3 and 4, the cleaning brush 22 extends in the lateral direction 40 over the entire width of the catalytic converter 12. No housing 36 is provided in the illustrated exemplary embodiment. However, in order to improve the incident-flow conditions, a housing 36 can also be provided in this exemplary embodiment.

As can be seen in particular from the detail plan view shown in FIG. 4, the cleaning brush 22 is mounted at the side on a longitudinal guide 44. In this case, FIG. 4 shows only a detail illustration, thus illustrating only a longitudinal guide on the left-hand half of the figure. The cleaning brush 22 can be moved along the longitudinal guide 44 in the longitudinal direction 42. In this case, the longitudinal guide 44 is arranged on the inside of a wall 46 of the exhaust duct 6. The cleaning brush 22 is caused to rotate by a drive motor, which in particular is in the form of a fluid motor 48 and, as illustrated by way of example, is arranged directly on a brush shaft of the cleaning brush 22. A fluid motor means a motor which can be driven by a pressurized fluid, in particular compressed air. The fluid motor 48 is therefore preferably in the form of a pneumatic motor.

During operation of the combustion system 2, the cleaning device 20 moves either continuously or at specific intervals over the inlet side 14, thus removing deposits from it. As a result of the rotation of the cleaning brush 22, the brush hairs 26 during this process scratch off deposits such as dust and soot particles from the surface of the inlet side 14. Because of their elasticity, the brush hairs 26 wipe over the inlet side 14, being angled somewhat in this case, and can thus also penetrate somewhat into the flow ducts 16, thus achieving deep cleaning to a certain extent. For particularly effective cleaning, provision can in this case be made for the rotation direction 30 of the cleaning brush 22 to be reversed on an alternating basis.

The particles which have been scraped or scratched off by the brush hairs 26 are thrown away by the brush hairs 26. They are then removed either solely by the centrifugal force or with the aid of the stripping element 28 from the brush hairs 26, and are introduced into the flowing exhaust gas A. These particles, which have now also been reduced in size in particular by the mechanical action, are carried away with the flowing exhaust gas A through the flow ducts 16.

The specific orientation of the stripping edge 32 and the shape of the stripping element 28 overall are of major importance for effective stripping of the particles from the brush hairs 26. This is because, as a result of their elasticity, the brush hairs 26 are first of all elastically angled during the stripping process, in order then for the stress to be removed again, in particular suddenly, as the cleaning brush 22 rotates further, thus resulting in the particles effectively being thrown off.

As a result of the injection of a cleaning fluid, in particular of a cleaning liquid or an aerosol, in which the cleaning liquid is generally distributed homogeneously into the inlet openings 18, any deposits which may be firmly seated are detached and can then be effectively removed mechanically by the cleaning brush 22.

In the exemplary embodiment shown in FIG. 2, the cleaning of the cleaning brush 22 is assisted by the injection device 34, because a cleaning fluid is also applied to the brush hairs 26. For example, this allows dust to be blown off from the brush hairs 26. In principle, it is possible to provide two separate injection devices 34, in which case these can be arranged with different cleaning fluids and in a different orientation. In this case, the cleaning fluid is preferably supplied outside the exhaust duct 6 and is then supplied to the injection device 34 within the exhaust duct, for example via the longitudinal guide 44 and possibly the lateral traverse.

The invention claimed is:

1. A combustion system, comprising:
   an exhaust duct for carrying away an exhaust gas;
   a catalytic converter disposed in said exhaust duct, said catalytic converter comprising catalyst elements and flow ducts through which the exhaust gas can flow for catalytic exhaust gas cleaning, said catalytic converter having inlet openings formed therein for the exhaust gas on an inlet side of said catalytic converter, where the inlet openings are located upstream of the catalyst elements in the catalytic converter; and
   a cleaning device located upstream of the catalytic converter, said cleaning device comprising (a) a cleaning brush for mechanical removal of deposits on said inlet side and the inlet openings, (b) a means of moving the cleaning device in a direction across said inlet openings on said catalytic converter and (c) an injection device for injecting a cleaning fluid, where the injection device is arranged so that said cleaning fluid is sprayed onto the cleaning brush, onto the inlet side and into the inlet openings.

2. The combustion system according to claim 1, wherein said cleaning brush covers only a subarea of said inlet side.

3. The combustion system according to claim 1, wherein said cleaning brush is a roller and rotates about a roller longitudinal axis.

4. The combustion system according to claim 3, wherein said cleaning brush extends over an entire width of said inlet side.

5. The combustion system according to claim 1, wherein said cleaning device further comprises a stripping element for cleaning brush hairs of said cleaning brush.

6. The combustion system according to claim 5, wherein said stripping element comprises a stripping edge oriented approximately radially with respect to a brush rotation axis, such that said brush hairs are elastically stressed during a stripping process, and the stress is then removed.

7. The combustion system according to claim 1, wherein said injection device can be moved together with said cleaning brush.

8. The combustion system according to claim 1, wherein said cleaning device further comprises a housing which is open toward said inlet side and in which said cleaning brush is disposed.

9. The combustion system according to claim 1, further comprising a fluid motor connected to said cleaning brush.

10. The combustion system according to claim 1, wherein said catalytic converter has a plurality of catalyst layers, which follow one another in a flow direction of the exhaust gas, said cleaning device being provided at least on one of said catalyst layers.

11. The combustion system according to claim 1, wherein said catalytic converter has a plurality of catalyst layers, which follow one another in a flow direction of the exhaust gas, said cleaning device being provided at least on a first of said catalyst layers.

12. A method for cleaning a catalytic converter installed in an exhaust duct of a combustion system, which comprises the step of:

removing deposits from an inlet side of the catalytic converter using a cleaning device comprising a cleaning brush, a means of moving the cleaning device in a direction across said inlet side of said catalytic converter-and an injection device that sprays a cleaning fluid onto the cleaning brush, onto the inlet side and into the inlet openings during operation, wherein said cleaning brush is located upstream of said catalytic converter, said cleaning device moves in a direction across said inlet openings on said catalytic converter during cleaning, and said catalytic converter comprising catalyst elements and flow ducts through which the exhaust gas can flow for catalytic exhaust gas cleaning, said catalytic converter having inlet openings formed therein for the exhaust gas on an inlet side of said catalytic converter, where the inlet openings are located upstream of the catalyst elements in the catalytic converter.

13. The method according to claim 12, which further comprises carrying out the removing step during operation of the combustion system.

* * * * *